Figure 1B:
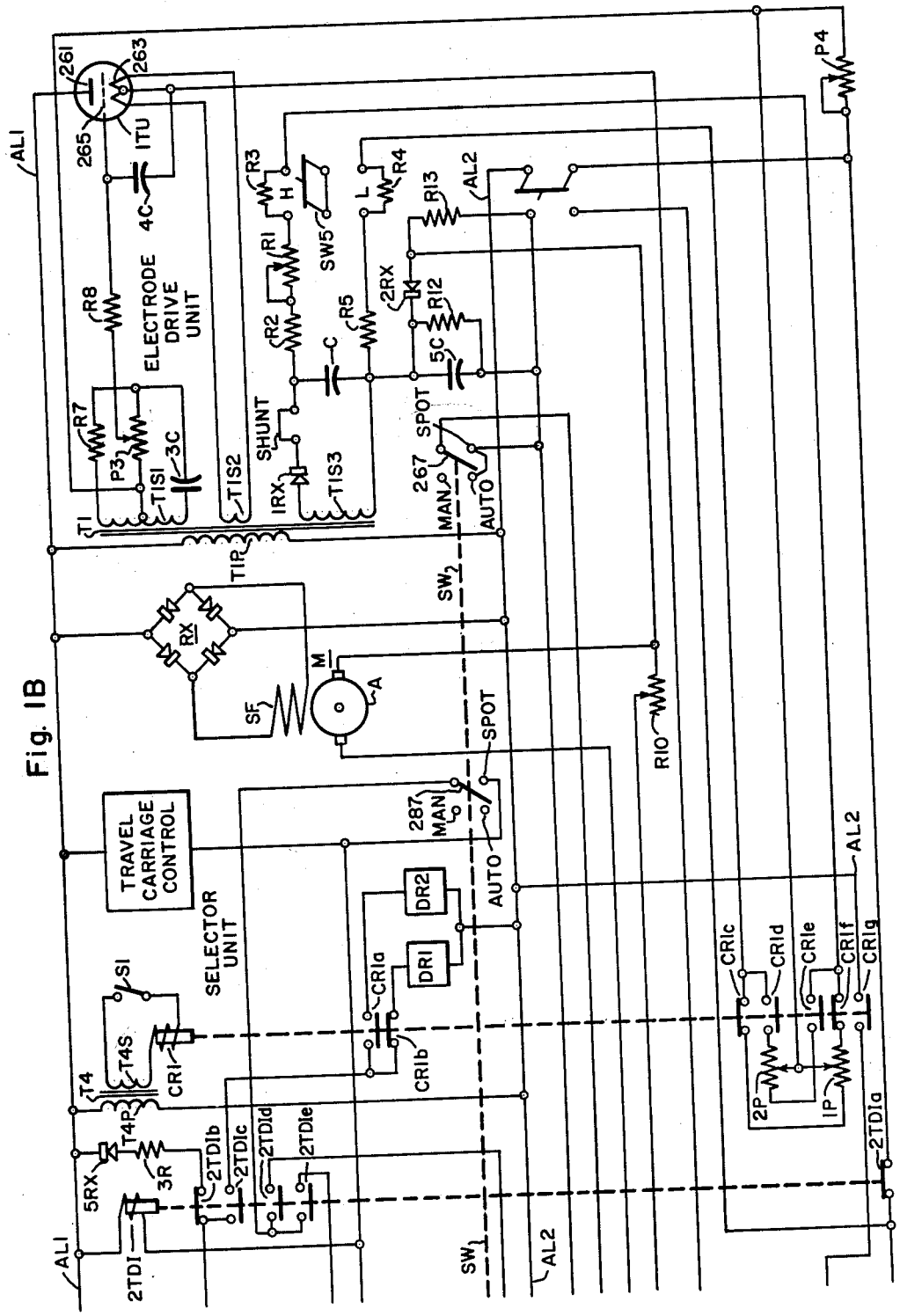

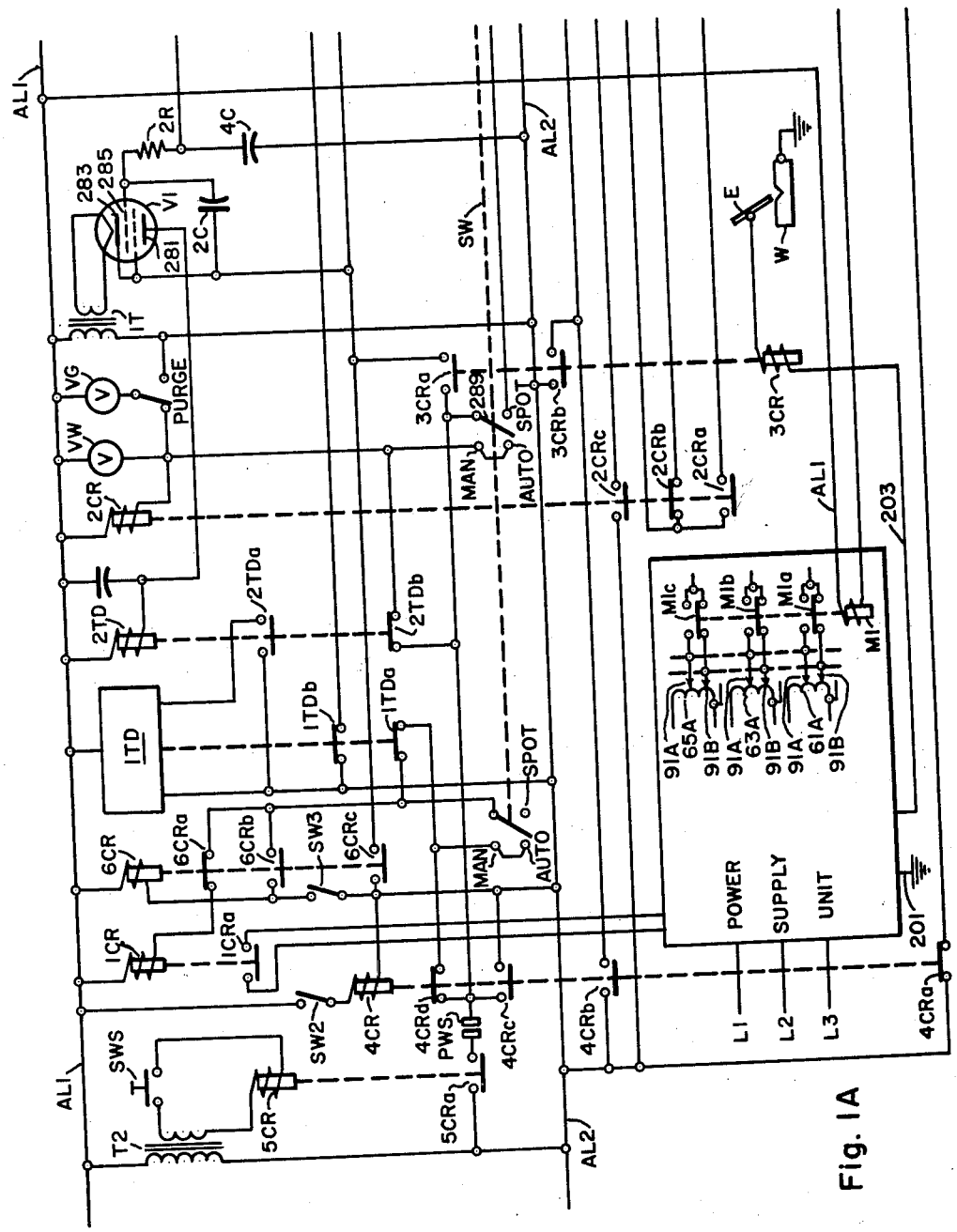

United States Patent Office 3,188,375
Patented June 8, 1965

3,188,375
ARC WELDING APPARATUS
Floyd E. Adamson, Eggertsville, N.Y., and Roger R. Giler, Canonsburg, Pa., assignors to Westinghouse Electric Corporation, East Pittsburgh, Pa., a corporation of Pennsylvania
Filed Aug. 13, 1962, Ser. No. 216,689
3 Claims. (Cl. 219—131)

This invention relates to arc welding and has particular relationship to arc welding in which the welds are of limited measured duration such as in arc-spot welding.

In such industries as the automotive industry it has been the practice in the past to fabricate such structures as automobile bodies by resistance spot or seam welding. Recently the resistance welding has been replaced by arc welding; in particular arc-spot welding has been used for burn-through or lap-tack welds. Where arc welding can be used the large and cumbersome press resistance welders and their controls may be dispensed with and the fabrication carried out at a substantially lower capital outlay than by resistance welding. In addition, the arc welding apparatus is highly portable and has greater flexible than resistance welding. Another factor is that the arc-welding current demands are substantially lower than the resistance-welding current and a saving in power is effected and disturbances of power lines presents no serious problem.

Arc-spot welding is semi-automatic. The operator controls neither the speed of the electrode over the distance nor the distance of the electrode from the joint being welded. The operator places a nozzle particularly suited to the joint being welded as taught by Morley Patent 2,845,524 over the joint and presses the trigger on a gun and the weld is produced. The speed of the electrode is determined by the preset speed of the motor which drives the electrode. The distance of the electrode from the work is determined by the rate at which the electrode advances into the arc.

A difficulty which has been encountered in using arc-spot welding apparatus in accordance with the teachings of the prior art in the automotive industry has resulted from the demands that such arc-welding apparatus be repeatedly reset for the different thicknesses of materials and for the different materials which are repeatedly encountered in the automotive industry. In some cases, the operator need only interrupt a welding operation and reset a nearby control before continuing. In others, the resetting may require that the operator climb out of an automobile body to readjust equipment before continuing the welding.

Attempts have been made to meet this difficulty by providing different equipments which are set differently to correspond to the different materials. This requires that the operator lay down one gun and pick up another as the different conditions are encountered. This expedient has the disadvantage not only that it is costly but it also introduces the problem of properly identifying the different guns so that an operator will not use the wrong gun to make a weld and thus require the work to be scrapped or to be repaired at substantial cost.

It is an object of this invention to eliminate the above described difficulties. Another object of this invention is to provide arc-welding apparatus which shall lend itself to the welding of different materials using a single unit.

In its broader aspects this invention comprehends arc-welding apparatus including provisions for presetting the welding parameters at different settings and facilities which enable the operator to set the apparatus readily at certain of the presettings in dependence upon the demands of the material being welded. While in the interest of simplicity in switching, the apparatus in accordance with this invention usually includes facilities for selecting only a few, usually two or three presettings, the range over which the few presettings can be made should be wide enough to accommodate the wide range of materials encountered. The principal parameters which are variable from one arc-spot welding operation to another are the duration of the weld, the speed of the electrode, which determines the welding current, and the welding voltage. It has been found in arriving at this invention that the materials to be welded are so different in the properties affecting the arc welding and particularly in thickness, that the welding apparatus in accordance with this invention must have a wide range of welding capability and to achieve this range at least two and sometimes all three of the above parameters must be variable. In accordance with a specific aspect of this invention, apparatus is provided which includes facilities for presetting both the duration of the weld and the welding current or electrode speed and for selecting one or another of several sets of these preset parameters in dependence upon the material being welded. It has been found that with apparatus having this welding facility welds over a range meeting the demands of the automotive industry can be met. In accordance with a further specific aspect of this invention, the range of the apparatus is further extended by providing facilities for presetting not only the duration and the welding current, but also the potential of the power supplied for welding.

In carrying out this invention, the duration of the welding is preset by presetting the timing of a timer, the timing of which may be carried out by pneumatic means or by means of a controlling valve and the welding current is preset by varying the speed of the motor which drives the electrodes. Specifically, where a valve is used for timing, the conduction of the valve may be determined by the time of discharge of a capacitor and discharge circuit for the capacitor includes a plurality of selectable discharge components preset to provide different discharge times. The motor speed may be controlled in different ways by means of valves or variable resistors. Typically the motor circuit includes a valve which controls the conduction of current through the motor and the valve includes a control circuit having a plurality of elements which determine the conduction of the valve and by the setting of which the conduction may be preset at different magnitudes.

The novel features considered characteristic of this invention are described generally above. For a better understanding of this invention, both as to its organization and as to its method of operation, together with additional objects and advantages thereof, reference is made to the following description of a specific embodiment taken in connection with the accompanying drawings, in which:

FIGURES 1A and 1B together constitute a schematic of a preferred embodiment of this invention.

The apparatus shown in FIGS. 1A and 1B includes a Power Supply Unit for supplying power for arc welding work W with an electrode E, an Electrode Drive Unit for advancing the electrode E into welding relationship with the work W, a Control Unit for controlling the advance of the electrode and the cooperation of the Electrode Drive Unit and the Power Supply Unit and a Selector Unit for selecting different sets of welding parameters. The above described division of the apparatus is functional rather than structural. The different Units need not be in separate containers. They may be mounted most conveniently for the use and the operation of the equipment.

The apparatus disclosed may be supplied from the usual commercial supply. The Power Supply Unit is supplied from the commercial buses of a three-phase supply through conductors L1, L2 and L3 which are energized through the usual circuit breakers or disconnects (not shown). The Control Unit, Electrode Drive Unit and Selector Unit are supplied from conductors AL1 and AL2 which supply single-phase alternating current and may be energized from two of the conductors L1, L2 and L3 through a transformer (not shown) or may be connected independently to alternating current conductors of a commercial power supply. The apparatus shown in FIGS. 1A and 1B may be set for manual (MAN), automatic (AUTO) or spot (SPOT) welding by the setting of a switch SW. Since the invention here disclosed involves primarily spot welding the switch SW will be regarded as set for SPOT welding in the description of the apparatus shown in FIGS. 1A and 1B.

The Power Supply Unit may be of the type disclosed in Bichsel Patent 2,786,160. This Power Supply Unit is of the constant-potential type and its output potential is determined by the setting variable transformers labeled 61, 63, 65 in FIG. 1 of the patent. In apparatus in accordance with this invention, the Power Supply Unit includes variable transformers 61A, 63A, 65A each of which has a plurality of taps 91A and 91B which may be preset and selected in one position 91A or the other 91B by operation of contacts M1a, M1b, M1c of a contactor M1 controlled from the Selector Unit. When the contactor M1 is deenergized, the contacts are in one position providing for one potential for welding. When the contactor is energized, a second potential is provided for welding. The contactor M1 is actuable on the closing of contact CR1g in the Selector Unit. The setting of the contactor M1 and the selection of the potential supplied for arc welding by the Power Supply Unit is coordinated with a corresponding setting for the electrode speed and the timing by the relay CR1.

The Power Supply Unit includes output terminals or conductors 201 and 203, 201 being grounded and 203 being connected to the electrode E through the coil of a current relay 3CR. The work W is usually grounded. The relay 3CR has front contacts 3CRa and 3CRb.

The Electrode Drive Unit is of the type disclosed in Bichsel et al. Patent 2,913,653 and includes a motor M having an armature A and a shunt field SF. The shunt field is energized from conductors AL1 and AL2 through rectifier RX. The Electrode Drive Unit also includes a valve which may be a thyratron 1TU. This thyratron has an anode 261, a cathode 263 and a grid or control electrode 265.

During normal welding, the armature A is energized in a circuit extending from conductor AL1 through the anode 261 and cathode 263 of the thyratron, front contact 2CRa of starting relay 2CR in the Control Unit, the armature A, a resistor R13 which provides a potential for IR drop compensation, contact 267 of the switch SW, front contact 2CRc of the starting relay 2CR to AL2.

The speed of the motor is determined by the conduction of thyratron 1TU and this is set by a control circuit energized from the transformer T1. Transformer T1 has a primary T1P supplied from conductors AL1 and AL2 and secondaries T1S1, T1S2 and T1S3. Secondary T1S1 provides phase-shifted alternating potential in the control circuit which is superimposed on a plurality of direct-current component potentials including a selected bias, the potential across the armature A and the IR drop compensation potential. This phase-shifted potential is derived from a phase-shift network including a resistor R7 and a capacitor 3C. The phase-shifted potential across the network is set by a variable resistor P3. The control electrode is connected to the adjusting arm of the resistor P3 through a grid resistor R8. The bias for the thyratron 1TU is provided by a capacitor C which is charged through a rectifier 1RX from the secondary T1S3. This capacitor is shunted by fixed resistors R2, R3, R4 and R5 and by variable resistor R1, and selectively by variable resistor 1P and 2P. For high speed operation, resistor R3 may be shunted by switch SW5 and for low speed operation resistor R4 may be shunted.

Resistors 1P and 2P may be selectively connected in the bias circuit in dependence upon the setting of the relay CR1. With the relay CR1 in the unactuated condition, resistor 1P is connected in the bias circuit through back contacts CR1f and back contact CR1c. With the relay CR1 actuated, resistor 2P is connected in the bias circuit through front contacts CR1e and CR1d. The resistors 1P and 2P may be preset in accordance with the different speeds of the electrode E desired for different ranges of materials being welded. The setting of the resistors 1P and 2P is coordinated with the corresponding settings of the variable transformers 61A, 63A and 65A. The biasing network including capacitor C is connected to one terminal of variable resistor P3 of the phase shift network through the junction of the adjustable arms of resistors 1P and 2P.

The control circuit also includes a network for impressing an IR drop compensation potential dependent on the load current conducted by the armature A through resistor R13. This potential is impressed on the capacitor 5C which is shunted by resistor R12 through rectifier 2RX. The capacitor 5C is charged from resistor R13 which conducts the armature current so that the charging potential is proportional to the armature current and is a measure of the IR drop compensation required.

The control circuit of the Electrode Drive Unit is effective during the intervals during which the thyratron 1TU is not conducting and resistor R13 is not carrying current. This control circuit extends from the grid 265, through the grid resistor R8, the variable resistor P3, the selected variable resistor 1P or 2P and the biasing network including capacitor C, the IR drop compensation network including capacitor 5C, the resistor R13, the armature A, the front contact 2CRa of the relay 2CR to the cathode 263 of the thyratron. The conduction of thyratron 1TU and the speed of the motor M is dependent on the setting of the variable capacitor 1P or 2P and the IR drop voltage. By setting the speed of the electrode, the arc welding current may be set.

At the start of the welding operation, the electrode is inched towards the work by the Electrode Drive Unit. During inching, the speed of the motor is controlled by variable resistor P4 in a circuit extending from the grid 265 through the resistor R8, the variable resistor P3, the variable resistor P4, the back contact 2TD1a of relay 2TDI, back contact 4CRa, front contact 2CRc, contact 267 of switch SW, resistor R13, armature A, front contact 2CRa to the cathode of thyratron 263.

The Control Unit includes the starting relay 5CR having only a front contact 5CRa which is actuated by the closing of push button or foot switch SWS to start a welding operation. The coil of 5CR is supplied from the secondary T2S of the transformer T2 energized from the conductors AL1 and AL2.

The Control Unit also includes the inching relay 4CR which is energized from conductors AL1 and AL2 through the inch switch SW2 usually on the welding gun (not shown) when this switch is closed. The relay 4CR has in addition to the contact 4CRa, contacts 4CRb, 4CRc and 4CRd. The Control Unit also includes the control relay 1CR for the Power Supply Unit. This relay has a front contact 1CRa; when 1CRa is closed, the Power Supply Unit is energized and there is power between conductors 201 and 203. The coil of relay 1CR is adapted to be connected in an energizing circuit supplied from conductors AL1 and AL2 which extends from AL1 through the coil, back contact 6CRa of a test relay, back contact 1TDa of a timer 1TD, back contact 4CRd, a water pressure switch PWS which is closed when the water pressure is adequate, front contact 5CRa to AL2. When 5CR is actuated, the relay 1CR is actuated and the Power Supply Unit is energized.

The Control Unit also includes the test relay 6CR which is adapted to be energized from conductors AL1 and AL2 when test switch SW3 is closed. This relay has in addition to the contact 6CRa, front contact 6CRb and 6CRc.

The Control Unit also includes the timer 1TD which serves to control the burn-back of the electrode E at the end of a weld. This relay has back contacts 1TDa and 1TDb and is energized from conductors AL1 and AL2. The timing out of relay 1TD is started on the closing of contact 2TDa of relay 2TD. The relationship between timer 1TD and relay 2TD is shown in detail in Adamson Patent 3,013,144. Relay 6CR of Adamson 3,013,144 corresponds to the relay 2TD of this application. When the relay 1TD times out, contact 1TDa opens and relay 1CR is deenergized, deenergizing the Power Supply Unit. This occurs after the electrode has burned back to the desired distance at the end of a spot welding operation.

The Control Unit also includes a second timer system which times the duration of the spot weld. This timer includes in addition to the relay 2TD the thyratron V1 and the relay 2TDI. The thyratron V1 times the weld duration; relay 2TDI is actuated at the beginning of the timing operation and the relay 2TD at the end of the timing operation. The relay 2TD includes in addition to the contact 2TDa, back contact 2TDb. The relay 2TDI includes the contacts 2TDIa, 2TDIb, 2TDIc, 2TDId and 2TDIe.

The thyratron V1 includes an anode 281, a cathode 283 and a control electrode or grid 285. The coil of the relay 2TD is adapted to be energized in a circuit extending from conductor AL1 through the coil, the anode 281, the cathode 283, the front contact 3CRa, the pressure switch PWS, the contact 5CRa to the conductor AL2. The thyratron V1 is maintained normally non-conducting by the charge on a capacitor 4C in its control circuit. This capacitor 4C is charged through rectifier 5RX in a circuit extending from AL1 through the rectifier 5RX, a resistor 3R, the contact 2TDIb, a capacitor 4C to AL2. At the start of the timing interval, the relay 2TDI is actuated interrupting the charging and the capacitor 4C is discharged through resistor DR1 or resistor RD2 in a time interval depending on the setting of the Selector Unit. The discharge circuit for DR1 extends from capacitor 4C through contact 2TDIc, front contacts, back contact CR1b and the resistor DR1. When relay CR1 of the Selector Unit is actuated, 4C is discharged through CR1a and DR2.

The contact 2DId is not ordinarily used for arc spot welding. It is intended for use when the principal selector switch is in the "AUTO" position for fully automatic welding. In arc spot welds such as automotive body work, the gun is portable and the work is stationary with no relative movement while the arc is burning.

The contact 2TDId when it is used connects the Travel Carriage Control which advances the work W in a circuit extending from conductor AL1 through the Travel Carriage Control, the contact 287 of switch SW, contact 2TDId, contact 289 of switch SW, the water pressure switch PWS and contact 5CRa. The Travel Carriage Control is also connected in a circuit extending from conductor AL1 through the Control, the contact 287, the contact 2TDIe, the contact 1TDb to AL2. Situations are anticipated in which the travel carriage will be used in the practice of this invention to produce a plurality or series of spot welds or a plurality of seam welds in different materials.

The coil of relay 2TDI is adapted to be energized in a circuit extending from conductor AL1 through the coil, the front contact 3CRa, the pressure switch PWS, the contact 5CRa to AL2. This coil has a lock-in circuit extending from AL1 through the coil, the switch contact 287, the contact 2TDId, the contact 289, the pressure switch PWS, the contact 5CRa to AL2 and also through 2TDIe, 1TDb to AL2.

The Control Unit also includes the starting relay 2CR and the water and gas valve solenoids VW and VG. The starting relay 2CR has the contacts 2CRa, 2CRb and 2CRc. The coil of the starting relay and the solenoids VW and VG are supplied in parallel in a circuit extending from AL1 to the coils and solenoids, the back contact 2TDb, the pressure switch PWS, the front contact 5CRa to AL2.

The Selector Unit includes the transformer T4 having the primary T4P and the secondary T4S, the relay CR1 and the selector switch S1. The relay CR1 has the front contacts CR1a, CR1d, CR1e, CR1g and the back contacts CR1b, CR1c and CR1f. With the selector switch S1 open, the back contacts set the weld timer V1, the motor speed and the potential impressed between the electrode E and the work W at one set of magnitudes. With the switch S1 closed, the front contacts of the relay CR1 are closed and set the weld time, the motor speed, and the welding voltage at a second set of magnitudes. The servo sets of magnitudes may be set to correspond to widely differing materials. In fact for most purposes it is only necessary to provide for selection of one of two weld times and speed control magnitudes. Considering, for example, parts of the same material, but of two different thicknesses, the thinner material would require a lower duration and a lower speed which would result in lower welding current and a lower arc supply voltage. The thicker material would require longer duration, a higher speed resulting in a higher welding current and a higher welding voltage. To the extent that variation within any set of magnitudes may be demanded, such variation may be achieved by varying the settings of the discharge resistors DR1 or DR2 in the timing system, the variable resistors 1P or 2P in the motor control circuits and the variable transformers 61A, 63A, 65A in the Power Supply Unit.

In the standby condition of the apparatus shown in FIGS. 1A and 1B, the switch SWS is open, relay 5CR deenergized, relay 1CR is then deenergized and the Power Supply Unit is deenergized so that there is no potential between the electrode E and the work W and relays 3CR is deenergized. Timer 1TD is deenergized, relays 2TD and 2CR are deenergized, thyratron V1 is non-conducting, relay 2TDI is deenergized. The switch S1 is in the open position and relay CR1 is deenergized. With relay 2CR deenergized the motor M is deenergized and the braking resistor R10 shunts the armature A. Thyratron 1TU is deenergized.

Preparatory to a welding operation DR1 and DR2 and 1P and 2P and if necessary 91A and 91B are set for the proper welding of two of the materials to be welded. Initially S1 may remain open and arc material may be welded and then S1 may be closed and the other material welded.

Initially, then CR1 is in the setting shown in the drawings. Each spot welding operation is started by the closing of the switch SWS energizing relay 5CR. If the water pressure is adequate, relay 2CR and the solenoids for the valves VW and VG are energized and the gun (not shown) is supplied with cooling water and gas flows through the gun to pre-purge the material being welded. In addition, relay 1CR is energized to energize the Power Supply Unit; potential now appears between the electrode E and the work W.

When relay 2CR is actuated, the anode circuit for the thyratron 1TU is closed through contacts 2CRa, 267 and 2CRc. In addition, the braking resistor R10 is disconnected from the armature A at contact 2CRa. Control potential is now impressed on the thyratron 1TU through the variable resistor P4 which sets the thyratron current to correspond to inching speed. This control potential is impressed through the contact 2TDIa, 4CRa, 2CRc, 267 and 2CRa. The electrode E now approaches the work W at an inching speed. When the electrode E contacts the work W, the relay 3CR is actuated and contact 3CRa closes. The anode circuit through V1 is now closed conditioning this thyratron to start timing out. In addition, relay 2TDI is actuated and locked in at 2TDI*d* and 2TDI*e*.

The lock-in circuit through 2TDI*d* is in series with the front contact 5CR*a* and the water pressure switch PWS and includes 2TD*b* and 2TDI*d*. This lock-in contact opens on the opening of the switch SWS. But the second lock-in circuit through 1TD*b* and 2TDI*e* remains closed until 1TD times out. This lock-in circuit assures that once start switch SWS is closed the operation continues throughout a complete welding cycle. The charging of the timing capacitor 4C is then interrupted at open contact 2TDI*b*. Capacitor 4C discharges through the resistor DR1 and thus the weld time times out. In addition, the circuit through the Travel Carriage Control is closed and locked in at contact 2TDI*d* and 2TDI*e*. At 2TDI*a*, the variable resistor P4 is disconnected from the control circuit of the thyratron 1TU and the control circuit including resistor 1P becomes effective.

The engagement of the electrode E with the work W causes an arc to be fired. The arc now burns and the electrode E is supplied at a speed determined by the variable resistor 1P. This speed determines the welding current. The welding voltage is determined by the setting of the variable transformer 61A, 63A and 65A.

This operation continues until the capacitor 4C is discharged through the resistor DR1. The thyratron V1 then fires energizing the relay 2TD. The timing out of 1TD is then started at contact 2TD*a*. After 2TD is actuated, 2TDI remains energized through 1TD*b* and the lock-in contact 2TDI*e*. The Carriage also continues to advance because of the lock-in contact 2TDI*e*. The relay 1CR remains energized because it is supplied with power through the contacts 6CR*a*, 1TD*a*, 4CR*d*, PWS, and 5CR*a*.

The relay 2CR is deenergized at contact 2TD*b*. With the relay 2CR deenergized, the motor circuit is opened and the braking resistor R10 is connected across the armature A. The motor M then stops. The arc continues to burn so long as contact 1TD*a* remains closed. This time interval is determined by timer 1TD which is set to produce the desired burn-back. Ultimately relay 1TD times out and contacts 1TD*b* and 1TD*a* open. The Travel Carriage control is then stopped, relay 2TDI is then reset and thyratron V1 is deenergized. The required number of welds are completed by repeating the above described operation. Thereafter switch S1 is closed and another material is welded.

The apparatus disclosed in FIGS. 1A and 1B enabled the operator without resetting the apparatus to weld two different materials with one apparatus which is preset to correspond to each of the materials. Because facilities for presetting the duration of the weld, the welding current and the welding voltage are provided, the range over which the materials may differ is wide. Thus an enormous saving in operator's time is effected with the apparatus.

While a preferred embodiment has been disclosed herein many modifications thereof are feasible. In its specific aspects, this invention is applicable to and is peculiarly suitable for, arc welding as distinct arc-melting. To the extent that this invention is applicable to arc-melting, the reference to arc welding herein is intended to apply to arc-melting. This invention is not to be restricted except insofar as is necessitated by the spirit of the prior art.

We claim as our invention:

1. Arc-welding apparatus for welding work with a consumable electrode comprising means connected to said electrode for advancing said electrode into welding relationship with said work, power-supply means connected to said electrode and work for maintaining a welding arc between said electrode and work, timing means connected to said power-supply means for timing the duration of said welding arc, and selective means connected to said advancing means and to said timing means for setting said advancing means to advance said electrode at a selected one of a plurality of speeds and simultaneously setting said timing means to a corresponding one of a plurality of durations.

2. Arc-welding apparatus for welding work with a consumable electrode comprising a motor connected to said electrode for advancing said electrode into welding relationship with said work, an energizing circuit for said motor including controllable valve means for controlling the supply of current to said motor, power supply means connected to said electrode and work for impressing a potential to maintain a welding arc between said electrode and work, timing means connected to said power-supply means for timing the duration of said arc, and selective means connected to said valve means and to said timing means for selecting any one of a plurality of preset control settings of said valve means to set the current supplied to said motor at a corresponding magnitude, and simultaneously setting said timing means to a corresponding one of a plurality of preset durations.

3. Arc-welding apparatus for welding work with a consumable electrode comprising a motor connected to said electrode for advancing said electrode into welding relationship with said work, an energizing circuit for said motor including a controllable valve means for controlling the supply of current to said motor, power supply means connected to said electrode and work for impressing a potential to maintain a welding arc between said electrode and work, timing means connected to said power-supply means for timing the duration of said arc, and selective means connected to said valve means and to said timing means for selecting any one of a plurality of preset control settings of said valve means to set the current supplied to said motor at a corresponding magnitude, simultaneously setting said timing means to a corresponding one of a plurality of preset durations and simultaneously setting said power supply means to impress a corresponding one of a plurality of potentials between said electrode and work.

References Cited by the Examiner
UNITED STATES PATENTS

| | | | |
|---|---|---|---|
| 2,786,160 | 3/57 | Bichsel | 315—141 |
| 2,913,653 | 11/59 | Bichsel | 318—331 |

RICHARD M. WOOD, *Primary Examiner.*